I. D. PERRY.
MOTOR VEHICLE STEERING GEARING.
APPLICATION FILED DEC. 7, 1916.
1,217,104.
Patented Feb. 20, 1917.
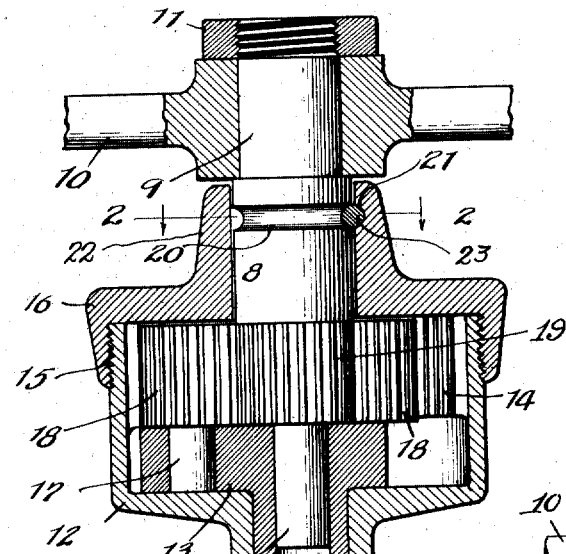
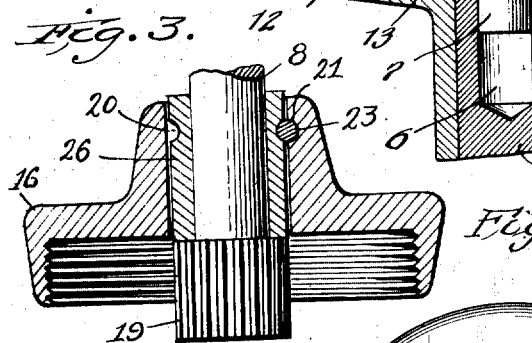
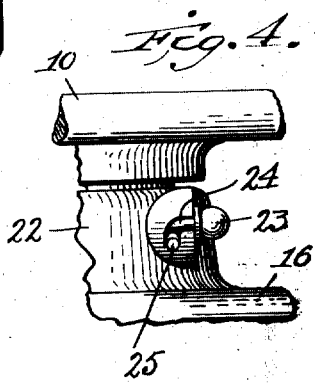
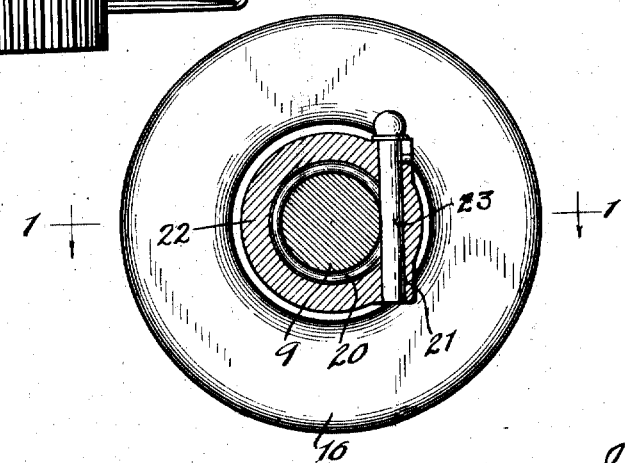
INVENTOR.
Ira D Perry
BY Jones, Addington, Ames & Seibold
ATTORNEYS.

UNITED STATES PATENT OFFICE.

IRA D. PERRY, OF CHICAGO, ILLINOIS.

MOTOR-VEHICLE STEERING-GEARING.

1,217,104.  Specification of Letters Patent.  Patented Feb. 20, 1917.

Application filed December 7, 1916. Serial No. 135,611.

*To all whom it may concern:*

Be it known that I, IRA D. PERRY, a citizen of the United States, residing at Chicago, in the county of Cook and State of Illinois, have invented new and useful Improvements in Motor-Vehicle Steering-Gearing, of which the following is a full, clear, concise, and exact description, reference being had to the accompanying drawing, forming a part of this specification.

This invention has relation to that type of motor vehicle steering mechanism which employs a planetary gearing between the steering wheel and the steering post proper, and the object of my invention is to so construct the mechanism that it may be readily rendered inoperative, to thereby prevent the stealing of a vehicle, since, unless the steering mechanism is operative, it will be impossible to drive the vehicle under its own power, as more fully hereinafter set forth.

In the drawing annexed,—

Figure 1 is a vertical sectional view showing a preferred form of my invention;

Fig. 2 is a transverse section on the line 2—2 of Fig. 1;

Fig. 3 is a vertical sectional view illustrating a slight modification; and

Fig. 4 is a detail view illustrating the manner of securing the pin against accidental withdrawal.

In the drawing, the numeral 5 designates the usual steering post in the upper end of which an axial bore 6 is formed to receive the lower end 7 of the stud shaft 8, which carries the steering wheel 10, this wheel being fastened on the reduced upper end 9 of the shaft 8 by means of a nut 11.

The numeral 12 designates the usual gear housing upon the bottom of which rests the usual spider 13 affixed to the steering post 5. Upon the interior of the annular housing is formed the usual internal gear 14, and upon the exterior of the housing are provided screw threads 15 for the reception of the threaded part of the cap 16 of the housing. The usual intermediate gears 18 are in mesh with the gear 14 and are carried on the spider 13 by means of the usual vertical pins, one of which (17) is illustrated. The numeral 19 designates the usual central pinion of the gearing, which is affixed to the lower end of the stud shaft 8 and whose diameter is less than the diameter of the bore in the cap 16 in which the stud shaft is journaled, so that the stud shaft 8 and its connected parts may be withdrawn upwardly from the housing, the pinion 19 passing up through the bore in the cap, thereby making it possible by simply removing these parts to render the steering mechanism entirely inoperative.

To hold the stud shaft 8 with its gear 19 in operative position, I provide the stud shaft with an annular groove 20 and the upstanding nipple part 22 of the cap with a transverse hole 21, which hole coincides with the groove 20 when the pinion 19 is in operative position. To fasten the parts in this position, a pin 23 is inserted in the hole 21 so as to lie tangentially in groove 20, this pin being readily removable by simply sliding it out of the hole. Any suitable means may be employed to secure this pin 23 against being jarred out; for instance, I may use a bayonet slot device such as shown in Fig. 4, the bayonet slot 24 being formed in a slight tubular extension on the nipple 22 and pin 25 being provided for engagement with the slot. In Fig. 1, stud shaft 8 is shown large enough to fit the bore of the cap; that is, of approximately the same size as the pinion 10. In order to adapt my invention to certain well-known steering mechanism now on the market, in which the stud shaft is smaller in diameter than the pinion, I may employ a bushing 26, such as shown in Fig. 3, it being simply necessary to remove the steering wheel, slip this bushing down said shaft until it rests upon the pinion and then slip the pinion and the bushing in through the bore in the cap.

It will be observed that with my device I do not rely upon any part of the housing alone to hold the pinion 19 in operative position, but on the contrary employ an additional holding means such as pin 23, it being of course essential in all cases that the shaft carrying the pinion and the steering wheel shall be capable of being moved endwisely upwardly far enough to disengage the pinion from the remainder of the gearing.

The nature and scope of the invention having been thus indicated and its preferred embodiment having been specifically described, what is claimed as new is:

1. In a steering mechanism for vehicles, a steering post, a housing at the upper end thereof provided with a closure cap, a stud shaft entering the housing through a bore in the cap and carrying at its upper outer end a steering wheel and at its lower inner end a pinion, a planetary gearing within the housing of which said pinion forms a part, said stud shaft with its pinion and steering wheel being capable of an upward or endwise movement to thereby enable the pinion to be disengaged from the remainder of the gearing, and a device in addition to the housing cap for movably holding the stud shaft and pinion in operative position.

2. In a steering mechanism for vehicles, a steering post, a housing at the upper end thereof provided with a closure cap, a stud shaft entering the housing through a bore in the cap and carrying at its upper outer end a steering wheel and at its lower inner end a pinion, a planetary gearing within the housing of which said pinion forms a part, said stud shaft with its pinion and steering wheel being capable of an upward or endwise movement to thereby enable the pinion to be disengaged from the remainder of the gearing, and a device in addition to the housing cap for movably holding the stud shaft and pinion in operative position, said pinion having a diameter less than that of the bore of the cap to enable the pinion to be lifted up through the bore.

3. In a steering mechanism for vehicles, a steering post, a housing at the upper end thereof provided with a closure cap, a stud shaft entering the housing through a bore in the cap and carrying at its upper outer end a steering wheel and at its lower inner end a pinion, a planetary gearing within the housing of which said pinion forms a part, said stud shaft with its pinion and steering wheel being capable of an upward or endwise movement to thereby enable the pinion to be disengaged from the remainder of the gearing, and a device in addition to the housing cap for movably holding the stud shaft and pinion in operative position, said pinion having a diameter less than that of the bore of the cap to enable the pinion to be lifted up through the bore, the stud shaft being smaller in diameter than said bore and being provided with a bushing fitting the bore and the shaft and adapted to be removed with the shaft.

In witness whereof, I have hereunto subscribed my name in the presence of two witnesses.

IRA D. PERRY.

Witnesses:
F. E. JOHNSON,
EDITH ANDERSON.